United States Patent
Kaneko et al.

(10) Patent No.: US 6,320,349 B1
(45) Date of Patent: *Nov. 20, 2001

(54) METHOD OF ESTIMATING FIELD POLE POSITION OF SYNCHRONOUS MOTOR, MOTOR CONTROLLER, AND ELECTRIC VEHICLE

(76) Inventors: Satoru Kaneko, 1800-7, Hirano, Urizura-machi, Naka-gun, Ibaraki 319-2104; Ryoso Masaki, 21-23, Ogitsu-cho 1-chome, Hitachi-shi, Ibaraki 319-1413; Yuusuke Takamoto, Oonuma-ryo, 20-1, Higashikanesawa-cho 5-chome, Hitachi-shi, Ibaraki 316-0014; Taizou Miyazaki, Kokusai-ryo, 20-1, Mizuki-cho 2-chome, Hitachi-shi, Ibaraki 316-0024; Sanshiro Obara, 1739-170, Shirakata, Toukai-mura, Naka-gun, Ibaraki 319-1106, all of (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/371,046

(22) Filed: Aug. 10, 1999

Related U.S. Application Data

(63) Continuation of application No. 09/023,679, filed on Feb. 13, 1998.

(30) Foreign Application Priority Data

Feb. 14, 1997 (JP) .................................................... 9-030520

(51) Int. Cl.$^7$ ...................................................... H02P 5/28

(52) U.S. Cl. ..................... 318/798; 318/806; 318/807; 318/809; 318/700; 318/716; 318/721

(58) Field of Search .................................... 318/700–724, 318/798–811; 73/862, 862.08

(56) References Cited

U.S. PATENT DOCUMENTS

| | | |
|---|---|---|
| 4,258,302 | 3/1981 | Plunkett . |
| 4,694,210 | 9/1987 | Elliott et al. . |
| 5,444,349 * | 8/1995 | Rozman et al. .................... 318/716 |
| 5,585,709 * | 12/1996 | Jansen et al. ....................... 318/807 |
| 5,652,495 * | 7/1997 | Narazaki et al. ................... 318/716 |
| 5,689,169 * | 11/1997 | Kerkman et al. ................... 318/807 |
| 5,994,870 * | 11/1999 | Kaneko et al. ..................... 318/798 |

FOREIGN PATENT DOCUMENTS

| | | |
|---|---|---|
| 7-245981 | 7/1995 | (JP) . |
| 8-126379 | 8/1996 | (JP) . |

* cited by examiner

Primary Examiner—David S. Martin

(57) ABSTRACT

A power corresponding to an A/C voltage command id1* is applied in the d-axis direction of rotational coordinates of a stopped synchronous motor via a current control unit, a three-phase converting unit, and a power converter. Further, by using "an amplitude value of a current iq' in the q-axis direction of the rotational coordinates generated in response to the A/C voltage command id1*" which is fed back and detected via a current detector and a dq converting unit, a field pole position estimation value $\hat{\theta}$ is converged. The field pole position is estimated by using the converged field pole position estimation value $\hat{\theta}$ as a true value of the field pole position $\theta$ of the synchronous motor.

10 Claims, 5 Drawing Sheets

METHOD OF ESTIMATING FIELD POLE POSITION OF SYNCHRONOUS MOTOR, MOTOR CONTROLLER, AND ELECTRIC VEHICLE

This application is a continuation of application Ser. No. 09/023,679, filed Feb. 13, 1998.

BACKGROUND AND SUMMARY OF THE INVENTION

This application claims the priority of Japanese application No. 9-030525, the disclosure of which is expressly incorporated by reference herein.

The present invention relates to a field pole position estimating method and means for estimating a field pole position of a synchronous motor, a motor controller for controlling a synchronous motor at the time of activation by using the field pole position estimating means, and an electric vehicle.

In controlling a synchronous motor, since the phase of an A/C voltage applied to a synchronous motor is determined by the present field pole position of a rotor, it is necessary to detect the accurate field pole position of the rotor. Although it can be detected during rotation by using an output signal of a rotation pulse generating means for detecting the speed, that is, an encoder or the like, the output signal of the encoder cannot be used at the time of activation. A dedicated field pole position detector is therefore provided to detect the field pole position at that time of activation, and the phase of a voltage command is determined by a detection value of the detector.

The field pole position detector is usually constructed by three pole position detectors for phases of U, V, and W. Since the pole position is detected by a combination of commands of the phases, a variation error in a range from +30° to −30° is included. In motor controllers, especially in a controller used for an electric vehicle, there is a problem of high costs due to the use of the detector exists. Further, there is the possibility that a required torque cannot be assured due to influences of the variation error at the time of activation. There are also control problems associated with the time of activation on a steep slope or the like, and when the field pole position detector itself is broken, or inoperative. A method of estimating the field pole position without using the dedicated detector is therefore considered to be effective in solving the above problems.

Japanese Patent Application Laid-Open No. (JP-A) 7-245981 discloses a conventional technique of a field pole position sensorless control of a synchronous motor. According to the technique, current vectors of parallel and orthogonal component, are detected with respect to a vector of an alternating voltage which is applied to a synchronous motor of a salient pole type the phase angle between the applied vector and the magnetic flux axis is calculated from at least one of the components and the field pole position is estimated from the obtained phase angle. According to the technique, since the alternating voltage is applied to the magnetic flux axis, the field pole position can be estimated without allowing the motor to generate a torque.

According to "Evaluation of Estimation Accuracy in Mechanical Sensor-less Rotor Position Detecting Method of Permanent Magnetic Motor using Current Vector Locus", literature No. 180 published in the national convention of The Industry Applications Society of The Institute of Electrical Engineers of Japan, 1995, in the case where the A/C voltage is applied to a synchronous motor of a salient pole type when the motor is stopped, the vector loci of the stationary coordinates $\alpha\beta$ axis currents draw an ellipsoid in which the magnetic flux axis or the d-axis direction is expanded. If the longitudinal axis direction is obtained, and correction is performed on the basis of the frequency, the field pole position can be detected.

The conventional techniques have, however, the following problems. According to the technique disclosed in JP-A-7-245981, where a voltage vector is applied to the d- and q-axes of the rotational coordinates which are set on a drive device side and a motor current that flows accordingly is detected and the field pole position is calculated. The arithmetic expression used in this case is based on the voltage current equation of the synchronous motor. When it is considered that the voltage current equation includes inductances Ld, Lq of the d- and q-axes which fluctuate due to change in currents id, iq of the d- and q-axes, deterioration of the detection accuracy occurs because of the parameter error. According to the technique disclosed in the literature No. 180, since the detection value is deviated from the actual value by an amount of the phase difference between the impedances of the d-axis and the q-axis, correction is necessary. The arithmetic expression for obtaining the correction amount also includes the inductances Ld, Lq, which fluctuate by the change in the currents id, iq as mentioned above, so that the detection accuracy is affected by the parameter error.

On the other hand, the detecting method using the field pole position detector is not worthless. Instead it is a valuable way to improve the method of field pole position detection. A synchronous motor of a salient pole type in which a reluctance torque can be used is often employed as a motor for driving an electric vehicle. It is therefore necessary to accurately detect a field pole position of the synchronous motor of the salient pole type. In addition, the subject of high reliability and low cost of the field pole position detector is also a subject of the controller for an electric vehicle which controls the synchronous motor an electric vehicle.

It is an object of the invention to provide a method of estimating a field pole of a synchronous motor accurately.

Another object of the invention is to provide a reliable and cheap motor controller and electric vehicle using a field pole position estimating means.

According to a feature of the invention, an alternating current signal is applied in the d-axis direction of rotational coordinates of a synchronous motor, and a field pole position estimation value of the synchronous motor is converged by using a feedback current signal in the q-axis direction of the rotational coordinates generated by the application of the signal. This facilitates the estimation of the field pole position of the synchronous motor.

According to another feature of the invention, an alternating current voltage command at an angular frequency, in a range where a reactance component each of impedances of both of the d-axis and q-axis of the rotational coordinates is larger than predetermined times of a resistance component, is applied to a synchronous motor. The field pole position of the synchronous motor is then estimated from a motor current flowed in response to the alternating current voltage command and a field pole position polarity of the synchronous motor.

According to yet another feature of the invention, in a motor controller for controlling a synchronous motor by using a field pole position estimation value generated by a field pole position estimating means which estimates the field pole position, the field pole position estimating means applies an alternating current signal in the d-axis direction of rotational coordinates of the synchronous motor. The field pole position estimating means also converges the field pole position estimation value by using a feedback current signal in the q-axis direction of the rotational coordinates generated in response to the application, and generates the resultant field pole position estimation value.

According to still another feature of the invention, the field pole position estimating means applies an alternating current voltage command at an angular frequency, in a range where a reactance component of each of impedances of the d- and q-axes of the rotational coordinates is larger than predetermined times of a resistance component to the synchronous motor, and generates the field pole position estimation value from a motor current flowed in response to the alternating current voltage command and a field pole position polarity of the synchronous motor.

According to another feature of the invention, in a motor controller comprising a synchronous motor, a power converter for supplying an alternating current power to the synchronous motor, a calculating means for generating an alternating current voltage command to the power converter to thereby control the synchronous motor, and a rotation pulse generating means for detecting the rotating position of the synchronous motor, the calculating means has a field pole position estimating means for estimating the field pole position of the synchronous motor. The synchronous motor is controlled by using a field pole position detection value generated by the rotation pulse generating means and a field pole position estimation value generated by the field pole position estimating means.

According to another feature of the invention, an electric vehicle is controlled by the motor controller.

According to the invention, since influences by factors of inductances Ld, Lq in the d- and q-axes directions are eliminated, the field pole position can be estimated with great accuracy. Further, since the field position detector can be made unnecessary by using the field pole position estimating means of the invention, a very reliable and accurate motor controller and controller for an electric vehicle can be provided at low costs.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Embodiments of the invention will be described hereinbelow with reference to the drawings. A first embodiment of a field pole position estimating means of the invention will be first described with reference to FIGS. 1 and 2.

The principle of the field pole position estimation according to the first embodiment will be explained. Generally, a voltage equation of a synchronous motor of a salient type (Ld<Lq) is expressed by equation (1).

$$\begin{bmatrix} vd \\ vq \end{bmatrix} = \begin{bmatrix} R+pLd & -\omega Lq \\ \omega Ld & R+pLq \end{bmatrix} \begin{bmatrix} id \\ iq \end{bmatrix} + \begin{bmatrix} 0 \\ \omega \phi a \end{bmatrix} \quad \text{Equation (1)}$$

where, vd, vq=d- and q-axes voltages, id, iq=d- and q-axes currents, R=armature winding resistance, Ld, Lq=d- and q-axes inductances, $\omega$=motor frequency, $\phi a$=magnetic field main magnetic flux, and p=differential operator.

Since $\omega$=0 in a motor stopped state, Equation (2) as a voltage equation of a salient-pole type synchronous motor when the motor frequency $\omega$=0 is derived from Equation (1).

$$\begin{bmatrix} vd \\ vq \end{bmatrix} = \begin{bmatrix} R+pLd & 0 \\ 0 & R+pLq \end{bmatrix} \begin{bmatrix} id \\ iq \end{bmatrix} \quad \text{Equation (2)}$$

Figure 2:
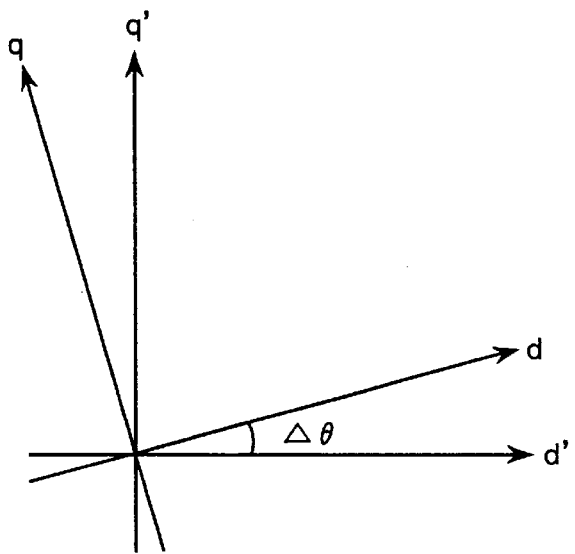
FIG. 2 is a diagram showing the phase difference between the d- and q-axes of rotational coordinates and the d'- and q'-axes of control coordinates of a synchronous motor.

Further, when a phase difference $\Delta\theta$ as shown in FIG. 2 exists between the d- and q-axes of the rotational coordinates of the synchronous motor and the d'- and q'-axes of the control coordinates for control, "a voltage equation of the salient pole type synchronous motor in which the phase difference between the d- and q-axes of the rotational coordinates of the synchronous motor and the d'- and q'-axes of the control coordinates for control is considered" of voltage commands of the d'- and q'-axes vd*,vq* and current detection values id',iq' of the d'- and q'-axes is shown by Equation (3).

$$\begin{bmatrix} vd^* \\ vq^* \end{bmatrix} = \begin{bmatrix} (R+pLd)(\cos\Delta\theta)^2 + (R+pLq)(\sin\Delta\theta)^2 & \frac{1}{2}p(Ld-Lq)\sin 2\Delta\theta \\ \frac{1}{2}p(Ld-Lq)\sin 2\Delta\theta & (R+pLd)(\sin\Delta\theta)^2 + (R+pLq)(\cos\Delta\theta)^2 \end{bmatrix} \begin{bmatrix} id' \\ iq' \end{bmatrix} \quad \text{Equation (3)}$$

Further, when the current control is taken into account and the d'- and q'-axes voltage commands vd*,vq* are expressed by Equation (4) as a determinant indicating a current control arithmetic operation and the equation is substituted for equation (3) to execute modification, a transfer function from the current commands id*,iq* to the current detection values id',iq' of the d'- and q'-axes of the control coordinates is expressed by a determinant (5).

$$\begin{bmatrix} vd^* \\ vq^* \end{bmatrix} = \begin{bmatrix} kd & 0 \\ 0 & kq \end{bmatrix} \begin{bmatrix} id^* & -id' \\ iq^* & -iq' \end{bmatrix} \qquad \text{Equation (4)}$$

$$\begin{bmatrix} id' \\ iq' \end{bmatrix} = \begin{bmatrix} G11 & G12 \\ G21 & G22 \end{bmatrix} \begin{bmatrix} id^* \\ iq^* \end{bmatrix} \qquad \text{Equation (5)}$$

where, kd, kq are current control gains.

When iq* is set to 0 and a command is given only to id*, a transfer function from the d-axis current command id* to a q'-axis current detection value iq' (hereinlater, simply called q'-axis current iq' or iq') is "only G21" in Equation (5) and the transfer function G21 is shown by Equation (6).

$$G21 = \frac{kdp(-Ld + Lq)\sin 2\Delta\theta}{2kdkq + (pLd + pLq + 2R)(kd + kq)2p^2 LdLq +} \qquad \text{Equation (6)}$$
$$2R(pLd + pLq + R) + (pLq - pLd)(kd - kq)\cos 2\Delta\theta$$

As understood from Equation (6), when there is no phase difference Δθ between the d- and q-axes of the rotational coordinates and d'- and q'-axes of the control coordinates of the synchronous motor, the q'-axis current iq' is not generated. On the contrary, when the phase difference Δθ exists, even when iq*=0 and a command is given only to id*, iq' is generated. Consequently, when a phase is corrected in such a manner that, by using the above principle, iq* is set to zero and a high-frequency command is given only to id* so that iq* accordingly generated is equal to zero (≈0), that is, when the phase is corrected so that Δθ is equal to zero (≈0), the phase when the phase error Δθ is zero can be accurately estimated as a field pole position. As understood from the contents, the field pole position can be estimated without being influenced by the inductances Ld, Lq, so that deterioration in the detection accuracy caused by the parameter error can be avoided.

Figure 1:
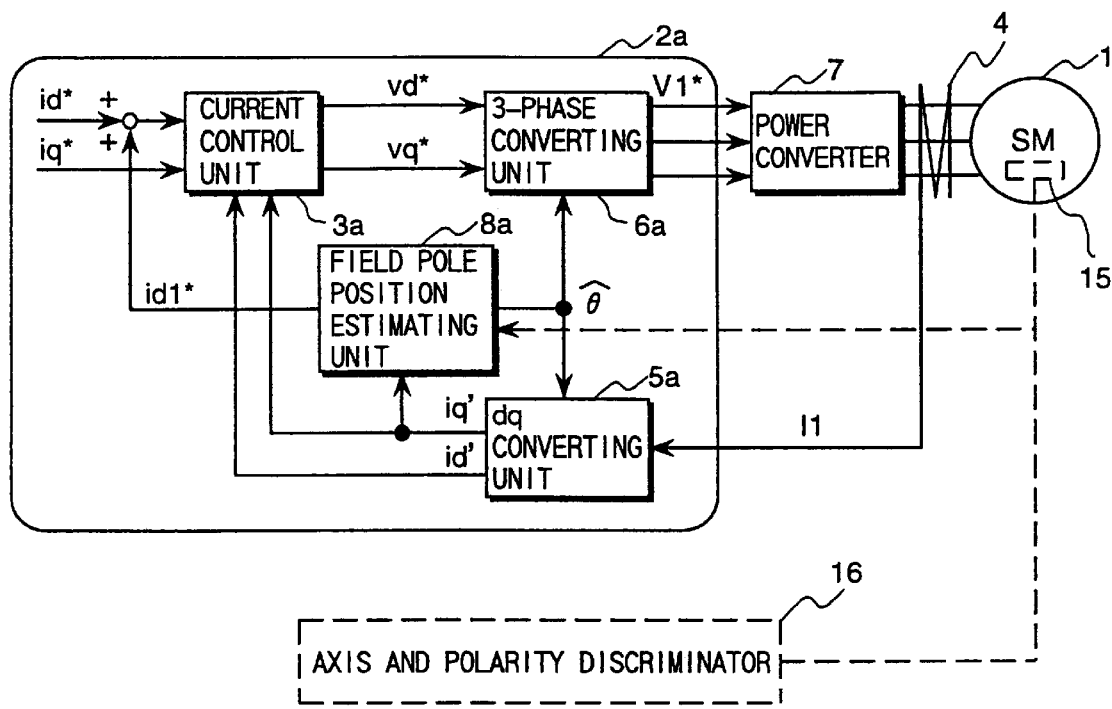
FIG. 1 is a diagram showing a field pole position estimating means of an embodiment according to the invention.

FIG. 1 is a diagram showing an example of the construction of a motor controller having a function of the field pole position estimating means. A D/C current of a battery (not shown) is converted to an A/C voltage by a current converter 7 and the A/C voltage is supplied to a synchronous motor 1. The current converter 7 generates an A/C voltage based on a 3-phase A/C voltage command V1* sent from a motor controller 2a. The motor controller 2a includes: a current control unit 3a; a dq converting unit 5a; a 3-phase converting unit 6a; a field pole position estimating unit 8a; a field pole position detector 15 for setting a field pole position initial value; and an axis and polarity discriminating unit 16. A motor current I1 detected by a current detector 4 is supplied to the dq converting unit 5a. The dq converting unit 5a performs a dq conversion to the motor current I1 to thereby generate id' and iq'.

The current control unit 3a calculates voltage commands vd* and vq* so that id' and iq' follow the current commands id*, iq*. Subsequently, the voltage commands vd* and vq* are converted to 3-phase A/C voltage commands V1* by the 3-phase converting unit 6a. The synchronous motor 1 generates a torque corresponding to the A/C voltage applied from the current converter 7. The axis and polarity discriminating unit 16 can be a part of the field pole position estimating unit 8a.

According to a field pole position estimating method of the embodiment, first, a power corresponding to the A/C current command id1* is applied in the d-axis direction of the rotational coordinates of the synchronous motor 1, which is stopped via the current control unit 3a, the 3-phase converting unit 6a and the current converter 7. A converging calculation is executed by using an amplitude value of the current iq' in the q-axis direction of the rotational coordinates, which is generated by the A/C current command id1* and is fed back and detected by the current detector 4 and the dq converting unit 5a and a field pole position estimation value θ^ of the synchronous motor which is separately given. The converged field pole position estimation value θ^ is used as a true value of the field pole position of the synchronous motor.

The initial value of the field pole position estimation value is detected by the field pole position detector 15 or calculated by the field pole position estimating unit 8a and is given.

In order to estimate the field pole position at the time of activation, the initial value (given value=$\theta_o$) of the field pole position estimation value θ^ of the synchronous motor is first set. The setting of $\theta_o$ will be described later. Subsequently, a d-axis current command id1* for estimation is generated from the field pole position estimating unit 8a to the current control unit 3a for a predetermined time at the time of activation from the stopped state (initial time of activation). An example of the d-axis current command id1* for estimation is a sinewave command having a predetermined frequency.

The field pole position estimating unit 8a receives the q'-axis current iq' generated by applying the d-axis current command id1* for estimation via the current detector 4 and the dq converting unit 5a. When there is a phase difference Δθ(=θ-θ^=θ-θ) between the field pole position estimation value θ^(=$\theta_o$) estimated by the field pole position estimating unit 8a and "the actual field pole position θ of the synchronous motor 1", iq'≠0. If iq'≈0 just in case, Δθ=θ-$\theta_o$=0 and θ=$\theta_o$, so that the given initial value $\theta_o$ is the true value of the field pole position θ of the synchronous motor 1.

However, generally iq'≠0. The field pole position estimating unit 8a corrects the field pole position estimating value θ^ (θ^ in the beginning is the initial value $\theta_o$) and repeats application, feedback detection, calculation, and the like until iq'≈0 and the phase error Δθ≈0 are obtained. That is, when the field pole position estimating unit 8a corrects the field pole position estimation value θ^ so that the q'-axis current iq' is converged at zero (a predetermined value close to zero), the field pole position estimation value θ^ when the phase error Δθ is converged at zero can be obtained as a true value of the field pole position θ of the synchronous motor 1.

The signal for estimation (for example, the A/C command id1*) is applied to the d-axis of the stopped synchronous motor and the calculation for converging the field pole position estimation value θ^ is executed in such a manner that the phase error Δθ is converged at zero by determining from the feedback current signal in the q-axis direction "expressed by the equation including a factor of the phase error Δθ between the field pole position estimation value θ^ and the field pole position θ" sent to the synchronous motor by the application of the A/C signal. Thus, the field pole position θ of the synchronous motor can be estimated with high accuracy without being influenced by the setting error of the motor constant or the like.

The following two methods can be considered to give the initial value $\theta_o$ used for the converging calculation.

(1) The field pole position measured by the field pole position detector 15 including a variation error in a range from +30° to −30° as shown in FIG. 1 is given.

(2) The field pole position estimation value θ^ calculated by the field pole position estimating means is given.

In case of a field pole position sensorless detection without using the field pole position detector 15, the field pole position estimation value θ^ is given as an initial value like the method of (2). Since the estimation calculatable range of the field pole position estimation value θ^ is 90° as understood from Equation (6), it is necessary to discriminate the axis (whether the d-axis or the q-axis) and the polarity with respect to the estimated value θ^.

According to an example of the axis discrimination, the axis is discriminated by using the saliency of the synchronous motor from the magnitude of the d'-axis current detection value id' flowed by the d-axis current command id1* for estimation. This axis discrimination is the well known method, so the detailed description is omitted. The polarity discrimination will be described hereinlater.

When there is the field pole position detector 15, the measured field pole position, which the axis and polarity discrimination is unnecessary, is used as an initial value (given value). When there is no field pole position detector 15, calculations including the axis discrimination and the polarity discrimination are executed to thereby obtain the field pole position estimation value θ^.

The equations (1) to (6) introduced in the embodiment are applied to the synchronous motors of the salient types. The invention can be also applied to synchronous motors of other types as long as an equivalent converging equation that can substitute is formed.

A second embodiment of the field pole position estimating means will be described with reference to FIG. 3.

The principle of estimation of the second embodiment will be described. First, a voltage equation of the synchronous motor of the salient type (Ld<Lq) is expressed by (1). Since ω=0 in a motor stopped state, Equation (2) can be obtained from Equation (1). Further, when Equation (2) is solved with respect to the motor current flowed by the A/C voltage command by applying a 3-phase A/C voltage of an angular frequency ω1 (A/C voltage command to obtain vα=V1·sin(ω1·t), vβ=V1·cos(ω1·t) of the axes of the stationary coordinates) for a predetermined time in the event of activation from the stopped state (initial time of activation), the α-axis current iα of the stationary coordinates when the motor frequency ω is zero and the 3-phase A/C voltage is applied is expressed by Equation (7). The β-axis current iβ of the stationary coordinates when the frequency ω is zero and the 3-phase A/C voltage is applied is expressed by Equation (8).

$$i\alpha = \frac{V1}{\sqrt{R^2 + (\omega 1 Ld)^2}} \cos(\omega 1 t - \theta d)$$ Equation (7)

$$\text{where, } \theta d = \tan^{-1}\left(\frac{\omega 1 Ld}{R}\right)$$

$$i\beta = \frac{V1}{\sqrt{R^2 + (\omega 1 Lq)^2}} \cos(\omega 1 t - \theta q)$$ Equation (8)

$$\text{where, } \theta q = \tan^{-1}\left(\frac{\omega 1 Lq}{R}\right)$$

It is understood from Equations (7) and (8) that, since the synchronous motor has the saliency (Ld<Ld), iα and iβ are expressed by the trigonometric function of different amplitudes. Vector loci of iα and iβ form an ellipsoidal and the longitudinal axis direction of the ellipsoidal is the direction (d-axis direction) of the field pole position. By calculating the longitudinal axis direction of the ellipsoidal, the field pole position upon activation can be therefore estimated and the field pole position estimation value θ^ can be generated. The longitudinal axis direction of the ellipsoidal can be derived by calculating magnitudes of vectors expressed by the square root of the sum of squares of iα and iβ and obtaining the maximum value.

As understood from Equations (7) and (8), the longitudinal axis direction is deviated from the d-axis direction by an amount corresponding to the phase difference between θd and θq. Consequently, it can be said that when there is a deviation in the longitudinal axis direction and the deviation amount is not corrected, the field pole position cannot be correctly estimated.

However, the phase difference is determined by the angular frequency ω1 of the 3-phase A/C voltage to be applied. As the angular frequency ω1 increases, the phase difference becomes smaller. When a sampling time of a calculating means 2 is considered and the angular frequency ω1 of the 3-phase A/C voltage to be applied is set to a value as high as possible, the phase difference becomes smaller and the correction of the deviation amount can be omitted. In other words, the longitudinal axis direction of the ellipsoidal obtained by calculating vectors by setting the angular frequency ω1 to a value as high as possible can be obtained as the true value of the field pole position θ of the synchronous motor 1. Since the field pole position is estimated without being influenced by the inductances Ld, Lq, deterioration in detection accuracy caused by the parameter error can be avoided.

For example, when the angular frequency ω1 of the 3-phase A/C voltage to be applied is set to a value, so that each of reactance components (ω1Ld and ω1Lq) of impedances of the d-axis and q-axis is five times as large as a resistance component (R=armature winding resistance) or larger, the deviation amount is suppressed to about 5° or smaller which is ⅙ or smaller than the maximum ±30° of the conventional technique. Consequently the estimation can be performed with high accuracy. Ld, Lq, and R are characteristic values of the synchronous motor and given values.

The higher the angular frequency ω1, the larger the ratio of the reactance component and the resistance component is and the smaller θd and θq obtained from $\tan^{-1}$ of the ratio of the reactance and resistance components are. The phase difference, that is, the deviation amount is consequently reduced and the accuracy is improved. When the sampling time of the calculating means 2 is considered, however, 70 times or less is practical and desirable. That is, when the A/C voltage command to be applied and the phase of the motor current are calculated by the calculating means, the operation cycle of the calculating means is determined by a sampling time of the calculating means. For example, assuming that the sampling time is 100 (μs), the angular frequency ω1 corresponding to the sampling number of about 10 is approximately 1 (kHz) and the reactance component of the impedance of each of the d-axis and q-axis is about 70 times as large as the resistance component. When the upper limit is determined daringly, it is around 70 times.

The second embodiment of the field pole position estimating means will be described specifically. The motor controller 2a shown in FIG. 3 has the function of the field pole position estimating means and includes the current control unit 3a, the dq converting unit 5a, the 3-phase converting unit 6a, the field pole position estimating unit 8a, and "the field pole position detector 15" or "a polarity discriminating unit 16a", (described later), for specifying the longitudinal axis direction. The polarity discriminating unit 16a can be a part of the field pole position estimating unit 8a.

Upon activation of the synchronous motor 1, the field pole position estimating unit 8a applies a 3-phase A/C voltage command V2* for field pole position estimation to the power converter 7 and receives a motor current I1 flowed in response to V2*. The angular frequency ω1 of the 3-phase A/C voltage command V2* lies within a range in which each of the reactance components of the d-axis and q-axis is predetermined times as large as the resistance component or larger. The range of the predetermined times is not limited and can be changed since there are cases where ranges of three times or larger and ranges smaller than 120 times are practical ranges according to the use. The range of five times or larger or the range from five times to 70 times is preferable.

On the basis of the principle, the field pole position estimating unit 8a specifies the longitudinal axis direction of the vector loci of the αβ axis currents iα and iβ of the stationary coordinates and uses the field pole position estimation value θ^ as a phase obtained by calculating the vectors from the specified longitudinal axis direction as the true value of the field pole position θ of the synchronous motor 1.

Since the longitudinal axis direction of the vector loci of the αβ axis currents iα and iβ of the stationary coordinates is used as a field pole position in the second embodiment, the discrimination of the axis as described in the first embodiment is unnecessary. However, since there are two longitudinal axis directions, it is necessary to determine the polarity in order to specify the field pole position of which longitudinal axis direction. This is performed because of the need to assign a field pole position polarity (give value).

The following two methods of giving the field pole position polarity can be considered in the second embodiment.

Figure 3:
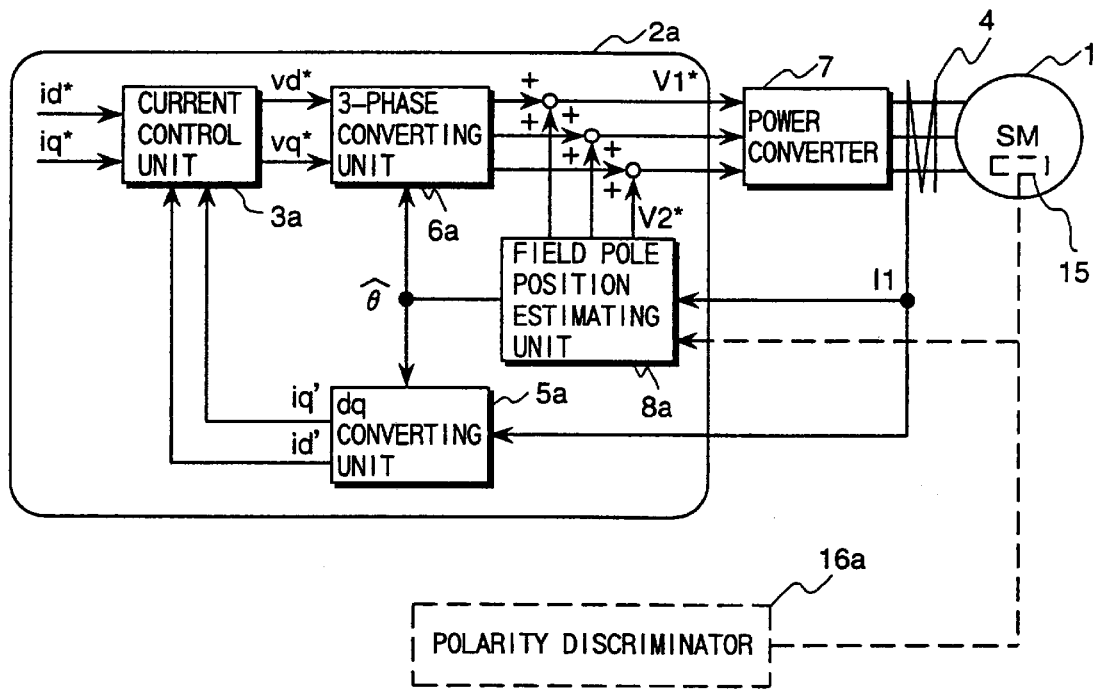
FIG. 3 is a diagram showing a field pole position estimating means of another embodiment according to the invention.

(1) The field pole position polarity is given from the polarity included in a measured polarity position obtained from the magnetic polarity position detector 15 as shown in FIG. 3.

(2) The result of polarity discrimination of the polarity discriminating unit 16a is given. The polarity discrimination will be described later.

The second embodiment is characterized in that the A/C voltage command of the angular frequency in a range such that each of the reactance components of the impedances of the d-axis and q-axis of the rotational coordinates is predetermined times as large as the resistance component (preferably, a range of five times or larger or a range from five times to 70 times) is applied to the stopped synchronous motor, and the field pole position of the synchronous motor is estimated by calculating from the motor current flowing in response to the A/C voltage command and the field pole position polarity (given value) of the synchronous motor.

According to the second embodiment, since the voltage command for estimation has a high frequency, the highly accurate field pole position estimation in which accuracy is not influenced by the erroneous setting of the motor constant or the like can be realized. The synchronous motor to which the embodiment is applied is mainly a synchronous motor of the salient pole type. The invention can be also applied to synchronous motors of other types as long as the substitutable vector calculation equation is satisfied.

Figure 4:
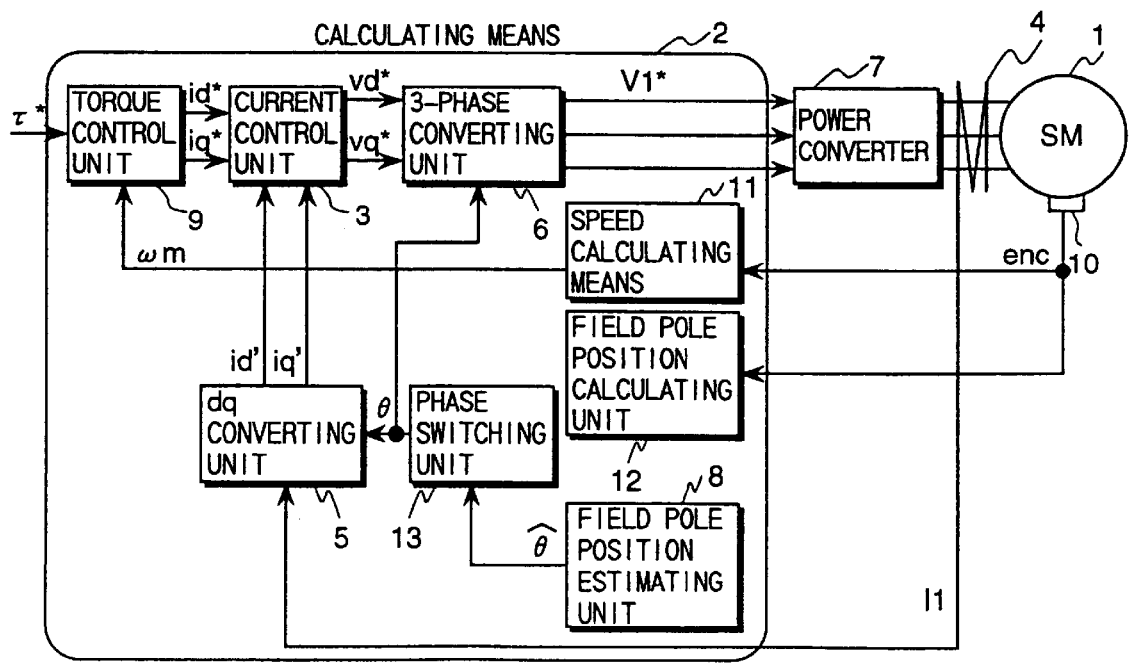
FIG. 4 is a diagram showing a motor controller of an embodiment according to the invention.

FIG. 4 shows an example of the construction of a motor controller for estimating the field pole position upon activation and detecting the field pole position during rotation without using the field pole position detector.

The motor controller shown in FIG. 4 includes the calculating means 2, the current detector 4, and a means 10 for detecting rotation and the like (hereinlater, called "rotation detecting means"). The calculating means 2 comprises a current control unit 3, a dq converting unit 5, a three-phase converting unit 6, a field pole position estimating means 8, a torque control unit 9, a speed calculating means 11, a field pole position calculating unit 12, and a phase switching unit 13. The field pole position estimating means 8 includes functions corresponding to the abovementioned axis and polarity discriminating unit 16 and the polarity discriminating unit 16a.

The speed calculating means 11 calculates a motor rotational speed ωm on the basis of an output signal enc from the rotation detecting means 10. The torque control unit 9 in the calculating means 2 calculates optimum current commands id*, iq* of the d- and q-axes of the rotational coordinates at the present operating point on the basis of a torque command τ* and the motor rotational speed ωm. Subsequently, in the current control unit 3, voltage commands vd*, vq* of the d- and q-axes of the rotational coordinates are calculated so that current detection values id', iq' follow the current commands id*, iq*. The 3-phase converter 6 calculates a 3-phase A/C voltage command V1* on the basis of the voltage commands vd*, vq*. The current converter 7 applies an A/C voltage based on the voltage command V1* to the synchronous motor 1. The synchronous motor 1 generates a torque according to the torque command τ*.

In this case, the dq converting unit 5 for calculating the current detection values id', iq' from the motor current I1 detected by the current detector 4 and the 3-phase converting unit 6 for calculating the 3-phase A/C voltage command V1* from the voltage commands vd*, vq* need the present field pole position θ of the rotor for the calculations.

In the embodiment, the calculating means 2 has therein the field pole position estimating means 8. At the time of activation, the field pole position estimation value θ^ obtained by the field pole position estimating means 8 is used as the present field pole position θ of the rotor. During the rotation, the pole position calculating unit 12 uses a field pole position calculation value θenc calculated by inputting the signal enc from the rotation detecting means 10 as the present field pole position θ of the rotor for control. The phases as the field pole positions upon activation and rotation are switched by the phase switching unit 13.

As mentioned above, the field pole position estimation value obtained by the field pole position estimating means 8 upon activation and the field pole position calculation value obtained by the means for detecting the field pole position during rotation are used to control the motor, so that the motor controller does not need a dedicated field pole position detector. The construction is accordingly simplified, costs are reduced, and the reliability can be improved. Further, the maximum field pole detection error of 30° upon activation of the field pole position detector of the conventional technique can be largely reduced.

Figure 5:
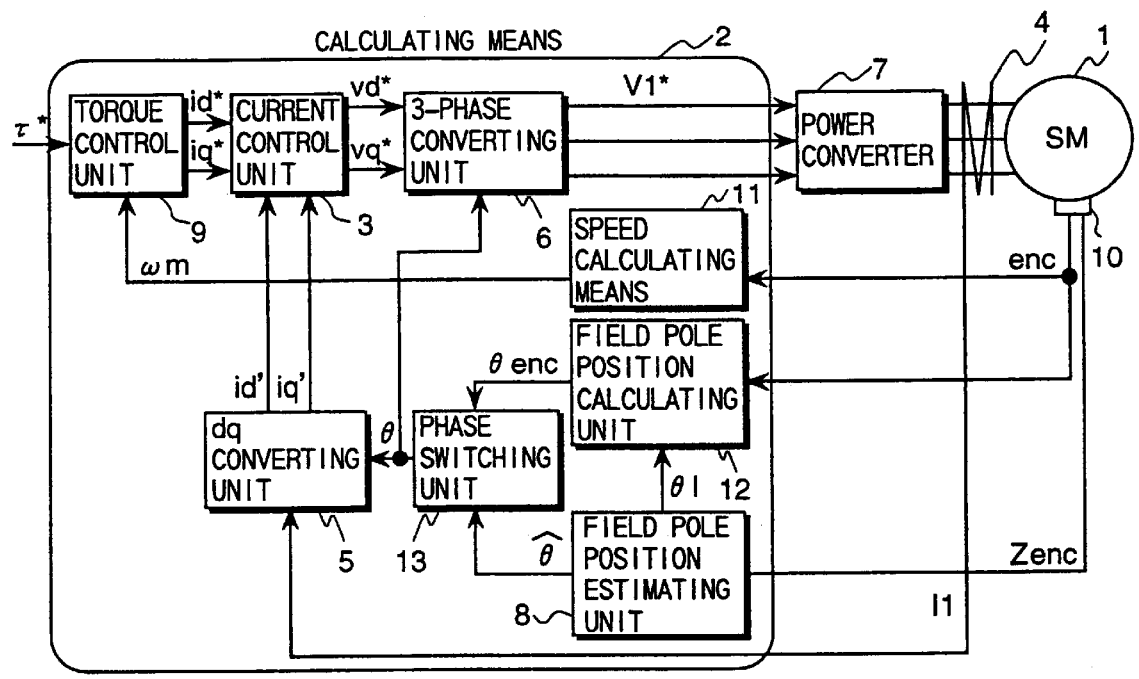
FIG. 5 is a diagram showing a motor controller of another embodiment according to the invention.
Figure 6:
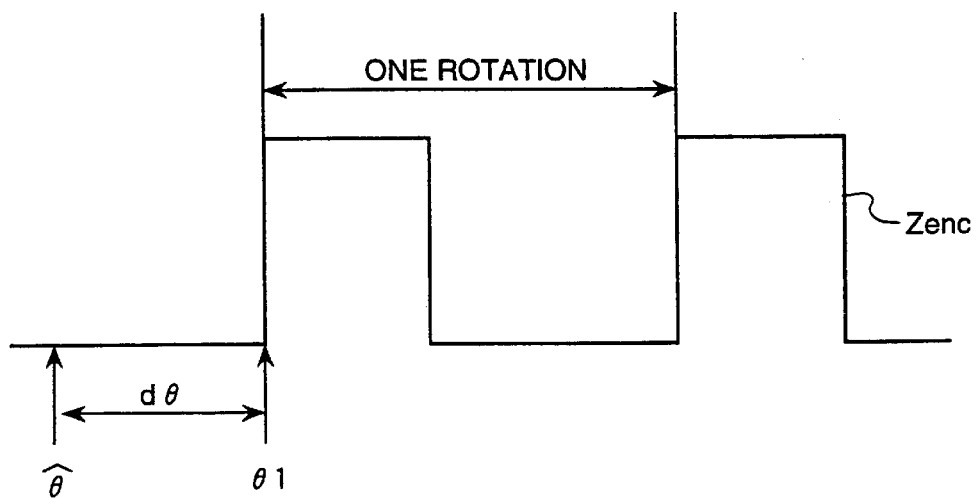
FIG. 6 is a diagram showing a waveform of a pulse Zenc generated by a rotation pulse generating means in FIG. 5.

The phase correction during rotation of the motor controller in the case of using no field pole position detector will be described. FIG. 5 shows a motor controller according to another embodiment of the invention. FIG. 6 is a diagram showing a waveform of a pulse Zenc generated by a rotation pulse generating means in FIG. 5.

The construction of the motor controller of the embodiment is obtained by providing a Z-phase pulse generating means for generating the pulses Zenc as Z-phase pulses in the rotation pulse generating means 10a in addition to the construction of the embodiment of FIG. 4. The field pole position estimating means 8 corrects the phase during rotation by using the pulses Zenc. If the rotation pulse generating means is a generally used encoder, the encoder itself as the rotation pulse generating means can also serve as a Z-phase pulse generating means, so that the construction can be simplified.

In FIG. 5, a relative phase can be detected by counting the signals enc from the rotation pulse generating means 10a by the field pole position calculating unit 12. However, when a dedicated detector for directly detecting the field pole position such as a field pole position detector is not used, the absolute phase cannot be detected at the time of rotation from the encoder as a rotation pulse generating means by the techniques at the present time. Correction for detecting the absolute phase is therefore necessary. The rotation pulse generating means 10a shown in FIG. 5 has the Z-phase pulse generating means for generating a pulse Zenc every rotation of the motor. The pulse Zenc is a Z-phase pulse as shown in FIG. 6 having a waveform in which the leading edge of a pulse occurs every rotation of the motor.

In FIG. 6, the field pole position estimating means 8 measures the phase difference $d\theta$ before occurrence of the leading edge (position of $\theta 1$) of the pulse Zenc on the basis of the field pole position estimation value $\theta\hat{}$ estimated upon activation while the synchronous motor 1 is stopped and the leading edge of the pulse Zenc inputted in association with the rotation of the synchronous motor 1. If the phase difference $d\theta$ can be measured, the position of the rotation phase $\theta 1$ when the leading edge of the pulse Zenc occurs (position of the reference phase $\theta 1$ for specifying the field pole position during rotation of the synchronous motor 1) can be specified. The field pole position calculating unit 12 corrects the field pole position calculation value $\theta$enc calculated by the field pole position calculating unit 12 by using the position of the rotation phase $\theta 1$ as a reference.

In other words, the field pole position estimating means 8 receives the leading edge ($\theta 1$) of the pulse Zenc as a Z-phase pulse generated every rotation of the synchronous motor 1 and generates "the rotation phase $\theta 1$ as a reference phase" for specifying the field pole position at the time of rotation on the basis of (the leading edge of) the Z-phase pulse and the field pole position estimation value $\theta\hat{}$. The field pole position calculating unit 12 corrects the field pole position calculation value $\theta$enc by using the inputted rotation phase $\theta 1$ as a reference position, thereby enabling the present field pole position $\theta$ of the rotor at the time of rotation to be specified without using a field pole position detector. In place of using the leading edge of the pulse, the trailing edge of the pulse can be also used. Further, if the number of the Z-phase pulses is within the number of pair of poles per rotation of the synchronous motor, it can be used to correct the phase at the time of rotation.

The polarity discrimination of the field pole position estimation value $\theta\hat{}$ upon activation will be described. Estimation in the whole range of 360° cannot be performed by the foregoing field pole position estimating means. It is therefore necessary to discriminate the polarity of the estimated field pole position. A polarity discriminating means of the axis and polarity discriminating unit 16 or the polarity discriminating unit 16a for discriminating the polarity of the field pole position estimation value $\theta\hat{}$ will be described hereinbelow. A polarity discriminating means using an output signal of the rotation pulse generating means will be first explained.

Figure 7:
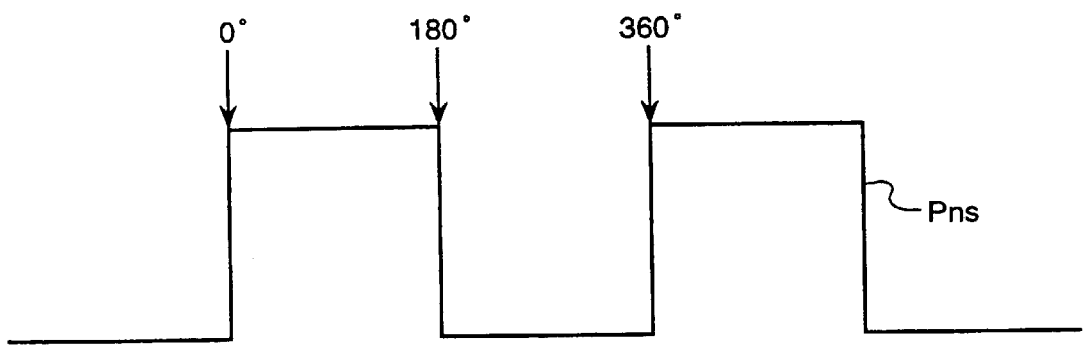
FIG. 7 is a diagram showing a waveform of a pulse Pns used by a polarity discriminating means of an embodiment according to the invention.

FIG. 7 is a diagram showing the waveform of pulses Pns used by the polarity discriminating means of an embodiment according to the invention, in which an electrical angle of the synchronous motor is inverted between "0° to 180°" and "180° to 360°".

The rotation pulse generating means 10a shown in FIG. 5 is provided with an inverting pulse generating means for generating a pulse Pns of the inverting waveform as shown in FIG. 7. The field pole position estimating means 8 for calculating the field pole position estimation value $\theta\hat{}$ receives the pulses Pns and can discriminate the polarity of whether "$\theta\hat{}$" or "$\theta\hat{}+\pi$" on the basis of the state of the pulse Pns, that is, whether in the range "from 0° to 180°" or the range "from 180° to 360°". Thus, the estimation in the whole range of 360° can be realized. The inverting pulse generating means can substitute for the Z-phase pulse generating means. The contents of the polarity discrimination of the field pole position estimation value $\theta\hat{}$ upon activation performed by the field pole position estimating means 8 are mentioned above.

By providing the rotation pulse generating means 10a with the inverting pulse generating means for generating the pulses Pns, the field pole position detection value $\theta$enc as an electric angle during rotation can be corrected by using the position of "the electric angle of 0° or 180°" of the pulse Pns. The construction of the embodiment is simplified and more advantageous than in the case of using Z-phase pulse generating means, since it is unnecessary to convert the pulse Zenc obtained as an mechanical angle to an electric angle.

Figure 8:
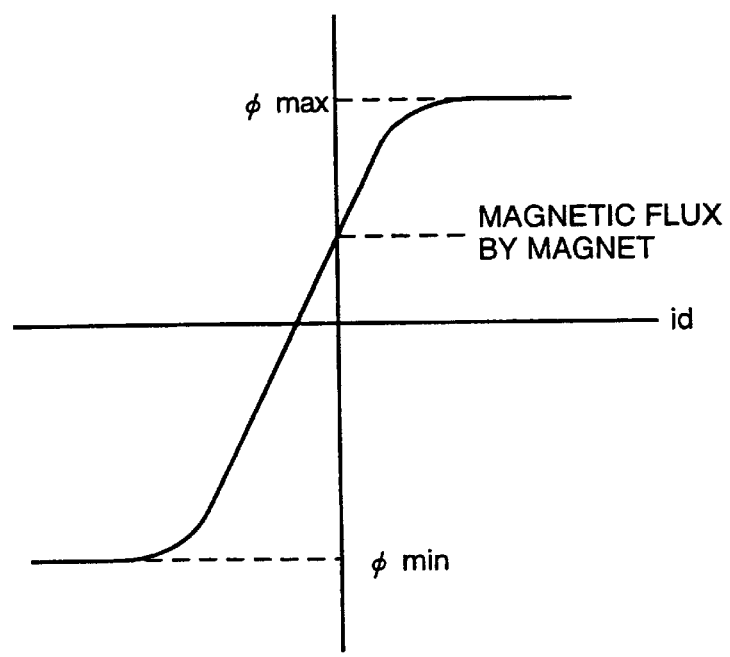
FIG. 8 is a diagram showing a magnetic saturation characteristic of a synchronous motor.
Figure 9:
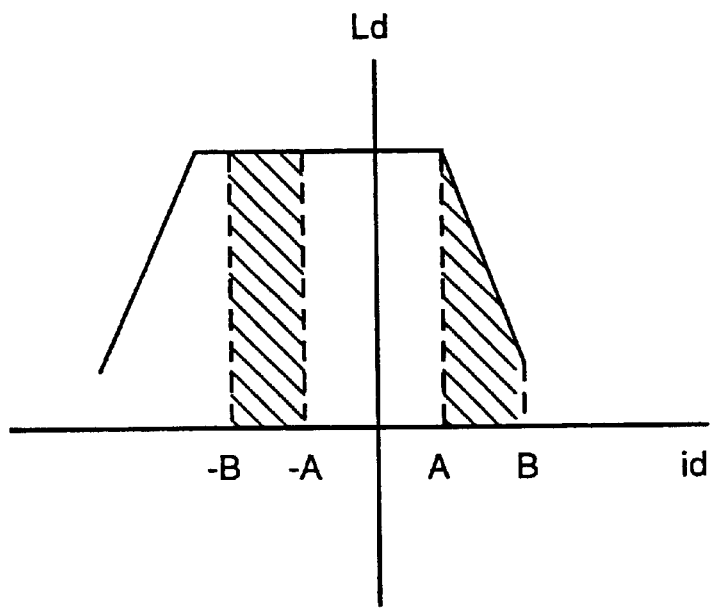
FIG. 9 is a diagram showing a characteristic of a d-axis inductance of a synchronous motor.
Figure 10:
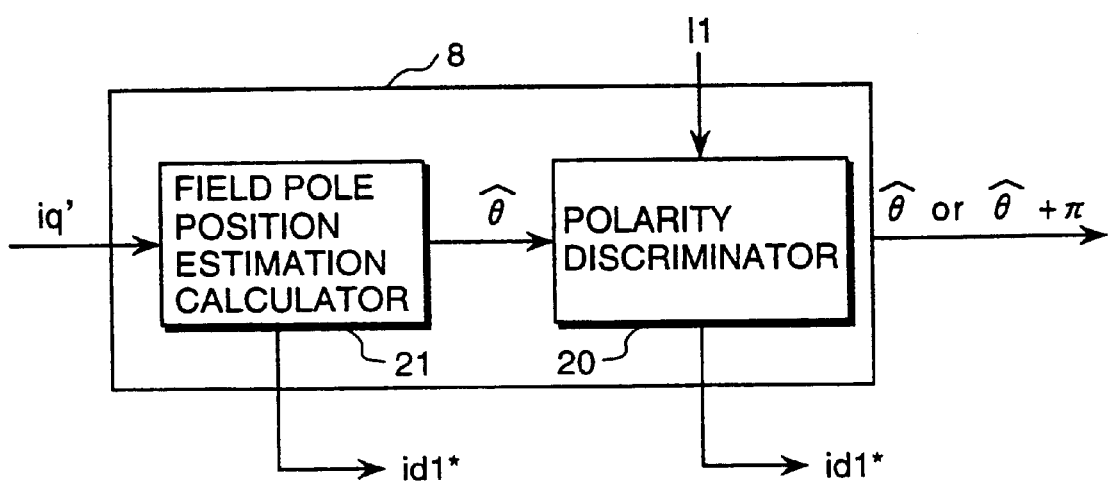
FIG. 10 is a diagram showing a polarity discriminating means of another embodiment according to the invention.

The polarity discriminating means of another embodiment using a magnetic saturation characteristic of the synchronous motor will be described. FIG. 8 is a diagram showing the magnetic saturation characteristic of the synchronous motor. FIG. 9 is a diagram showing a characteristic of the d-axis inductance of the synchronous motor. FIG. 10 is a diagram showing a polarity discriminating means of another embodiment according to the invention. The construction of the polarity discriminating means included in the field pole position estimating means 8 in case of discriminating the polarity is shown.

As shown in FIG. 8, the magnetic characteristic of the synchronous motor is such that, since a rotor of the synchronous motor has a magnetic flux by a permanent magnet, the magnetic flux exists even when the current id of the d-axis as a magnetic flux axis in the rotational coordinate system is zero. According to the magnetic characteristic, the characteristic of the d-axis inductance Ld is as shown in FIG. 9. As understood from FIG. 9, there are regions (hatched regions in FIG. 9) having different magnitudes of the d-axis inductance Ld due to the difference in positive and negative signs of the current id. When the "A/C voltage having a predetermined bias component" such that the current id corresponding to the hatched regions in FIG. 9 flows is applied to the d-axis, the positive or negative of the current id, that is, the difference in polarity appears in the magnitude of the amplitude of the motor current I1 as the magnitude of Ld. As a consequence by measuring the difference in the amplitude of the motor current I1, the polarity of the field pole position can be discriminated.

The construction and operation of the embodiment will be described with reference to FIG. 10. The polarity discriminating means provided in the field pole position estimating means 8 includes a polarity discriminator 20 and a field pole position estimation calculator 21.

In the embodiment, a voltage command vd1* for polarity discrimination as an A/C voltage having a predetermined bias component is generated from the polarity discriminator 20 to, for example, the current control unit 3a shown in FIG. 1. The polarity discriminator 20 receives the motor current I1 flowed in response to vd1* and discriminates the polarity of the field pole position estimation value $\theta\hat{}$ obtained by the field pole position estimation calculator 21 on the basis of the magnitude of the amplitude. The frequency and amplitude of the voltage command vd1* for polarity discrimination are set so that the difference in polarity can be detected as the difference in amplitude of I1. Although the case in which the polarity discriminating means is applied to the embodiment shown in FIG. 1 is described in FIG. 10, the polarity discriminating means can be also applied to the embodiment shown in FIG. 3.

The embodiment of the field pole position estimating means for estimating the field pole position with high accuracy upon activation of the salient pole type synchronous motor has been described above. By using the field pole position estimating means, the field pole position detector can be made unnecessary and the field pole position upon activation can be detected with high accuracy. Thus, a very accurate and reliable motor controller can be realized at a low cost.

The field pole position upon activation can also be detected with high accuracy when the field pole position detector is used. Since the motor controller can be applied to an electric vehicle controller of an electric vehicle using a synchronous motor of the salient pole type, a very accurate and reliable electric vehicle can be also provided at a low cost.

As mentioned above, according to the invention, the field pole position upon activation of the synchronous motor can be estimated by the field pole position estimating means with high accuracy. Further, by using the field pole position estimating means, the field pole position detector can be made unnecessary. Thus, a very reliable and accurate motor controller and controller for an electric vehicle can be provided at a low cost.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method of estimating a field pole position of a synchronous motor for applying an alternating current signal to the current command value in the d-axis direction of rotational coordinates of a synchronous motor, and executing a converging calculation of a field pole position estimation value of the synchronous motor from a current signal in the q-axis direction of the rotational coordinates generated by the application of the alternating current signal, thereby estimating the field pole position of the asynchronous motor, wherein said current signal in the q-axis direction of the rotational coordinates is generated by converting a q-axis component of motor current.

2. A motor controller for controlling a synchronous motor by using a field pole position estimation value generated by a field pole position estimating means which estimates the field pole position, wherein the field pole position estimating means applies an alternating current signal in the current command of a d-axis direction of rotational coordinates of the synchronous motor, executes a converging calculation of the field pole position estimation value by using a current signal in the q-axis direction of the rotational coordinates generated in response to the application of the alternating current signal, and generates the resultant field pole position estimation value, wherein said current signal in the q-axis direction of the rotational coordinates is generated by converting a q-axis component of motor current.

3. The motor controller according to claim 2, wherein the field pole position estimating means estimates the field pole position polarity from a state of a pulse (Pns) whose waveform is inverted each time the synchronous motor turns at an electrical angle of 180°.

4. The motor controller according to claim 2, wherein the field pole position estimating means applies a current voltage command or a current command having a predetermined bias component in the d-axis direction of the rotational coordinates to the synchronous motor and discriminates the field pole position polarity from the magnitude of an amplitude of a motor current (I1) flowed in response to the current voltage command.

5. The motor controller according to claim 3, wherein an electric vehicle is controlled by the motor controller.

6. The motor controller according to claim 4, wherein an electric vehicle is controlled by the motor controller.

7. The motor controller according to claim 2, wherein an electric vehicle is controlled by the motor controller.

8. An electric vehicle comprising a battery and a motor controller for controlling a synchronous motor by using a field pole position estimation value generated by a field pole position estimating means which estimates the field pole position, wherein the field pole position estimating means applies an alternating current signal in the current command of a d-axis direction of rotational coordinates of the synchronous motor, executes a converging calculation of the field pole position estimation value by using a current signal in the q-axis direction of the rotational coordinates generated in response to the application of the alternating current signal, and generates the resultant field pole position estimation value, wherein said current signal in the q-axis direction of the rotational coordinates is generated by converting a q-axis component of motor current.

9. An electric vehicle comprising a current converter and a motor controller for controlling a synchronous motor by using a field pole position estimation value generated by a field pole position estimating means which estimates the field pole position, wherein the field pole position estimating means applies an alternating current signal in the current command of a d-axis direction of rotational coordinates of the synchronous motor, executes a converging calculation of the field pole position estimation value by using a current signal in the q-axis direction of the rotational coordinates generated in response to the application of the alternating current signal, and generates the resultant field pole position estimation value, wherein said current signal in the q-axis direction of the rotational coordinates is generated by converting a q-axis component of motor current.

10. An electric vehicle comprising a synchronous motor and a motor controller for controlling the synchronous motor by using a field pole position estimation value generated by a field pole position estimating means which estimates the field pole position, wherein the field pole position estimating means applies an alternating current signal in the current command of a d-axis direction of rotational coordinates of the synchronous motor, executes a converging calculation of the field pole position estimation value by using a current signal in the q-axis direction of the rotational coordinates generated in response to the application of the alternating current signal, and generates the resultant field pole position estimation value, wherein said current signal in the q-axis direction of the rotational coordinates is generated by converting a q-axis, component of motor current.

* * * * *